United States Patent
. et al.

(10) Patent No.: US 12,021,932 B2
(45) Date of Patent: Jun. 25, 2024

(54) METHOD AND SYSTEM FOR PROVIDING SECURE PAIRING ACROSS DEVICES IN AN INTERNET OF THING (IoT) ENVIRONMENT

(71) Applicant: SAMSUNG ELECTRONICS CO., LTD., Suwon-si (KR)

(72) Inventors: Utkarsh ., Jharkhand (IN); Kushlam Chowrasiya, Kolkata (IN); Ashish Bhatt, Bangalore (IN); Muthukumaran Natarajan, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/163,872

(22) Filed: Feb. 3, 2023

(65) Prior Publication Data

US 2023/0224371 A1    Jul. 13, 2023

Related U.S. Application Data

(63) Continuation of application No. PCT/KR2023/000568, filed on Jan. 12, 2023.

(30) Foreign Application Priority Data

Jan. 13, 2022  (IN) .............................. 202241002185

(51) Int. Cl.
*H04L 67/141* (2022.01)
*H04L 67/303* (2022.01)
*H04L 67/52* (2022.01)

(52) U.S. Cl.
CPC .......... *H04L 67/141* (2013.01); *H04L 67/303* (2013.01); *H04L 67/52* (2022.05)

(58) Field of Classification Search
CPC ..... H04L 67/52; H04L 63/107; H04L 67/141; H04L 67/303
See application file for complete search history.

(56) References Cited

U.S. PATENT DOCUMENTS 9,451,418 B2    9/2016  Joseph et al.
9,560,477 B2 *  1/2017  Ling ....................... G01S 11/06
(Continued)

FOREIGN PATENT DOCUMENTS

KR        102246742 B1      5/2021

OTHER PUBLICATIONS

Wang, et al., "Wearable Device Pairing Method And System Based On IoT Cloud", Oct. 15, 2021, CN 113505157A (FIT English Translation), pp. 1-16 (Year: 2021).*

(Continued)

*Primary Examiner* — Jonathan A Bui
(74) *Attorney, Agent, or Firm* — CANTOR COLBURN LLP

(57) ABSTRACT

A method for providing secure pairing across devices in an Internet of Thing (IoT) environment, includes identifying presence information of one or more second IoT devices in a vicinity of a first IoT device and positional information of the one or more second IoT devices relative to the first IoT device, identifying transaction context information for one or more pairing transactions between the first IoT device and the one or more second IoT devices, generating a confidence zone based on at least one of the presence information, the positional information or the transaction context information, determining a pairing action between a target IoT device and the first IoT device based on the confidence zone and information for the target IoT device, and executing at least one action to establish or deny a secure pairing between the target IoT device and the first IoT device based on the pairing action.

20 Claims, 11 Drawing Sheets

(56) References Cited

U.S. PATENT DOCUMENTS

| | | | |
|---|---|---|---|
| 10,959,092 B2 | 3/2021 | Sharma et al. | |
| 11,756,419 B2 | 9/2023 | Fischer et al. | |
| 2010/0255782 A1 | 10/2010 | Klemmensen | |
| 2013/0210345 A1* | 8/2013 | Ling | H04W 12/50 |
| | | | 455/41.1 |
| 2014/0280983 A1* | 9/2014 | Paluch | H04L 67/14 |
| | | | 709/227 |
| 2016/0309286 A1 | 10/2016 | Son et al. | |
| 2017/0353979 A1 | 12/2017 | Lee et al. | |
| 2018/0183789 A1 | 6/2018 | Tischart et al. | |
| 2019/0174255 A1 | 6/2019 | Anders et al. | |
| 2020/0184798 A1 | 6/2020 | Hawkins | |
| 2020/0267217 A1 | 8/2020 | Defiebre et al. | |
| 2021/0067595 A1* | 3/2021 | Gum | H04W 4/029 |
| 2021/0103842 A1* | 4/2021 | Hardin | H04W 12/68 |
| 2022/0394793 A1* | 12/2022 | Rakshit | H04W 12/55 |

OTHER PUBLICATIONS

International Search Report dated Mar. 30, 2023 for PCT/KR2023/000568.

* cited by examiner

METHOD AND SYSTEM FOR PROVIDING SECURE PAIRING ACROSS DEVICES IN AN INTERNET OF THING (IoT) ENVIRONMENT

FIELD OF THE INVENTION

The present disclosure relates to a method and system for providing secure pairing across devices in an Internet of Thing (IoT) environment. More particularly, embodiments of the invention relate to a secure pairing method between devices in an IoT environment for a secure user experience in the IoT environment.

BACKGROUND

In an IoT environment, each IoT device may connect with another IoT device to form an interconnected network. Each IoT device may serve various functionalities to another IoT device after establishing a connection with each other. For example, in an IoT home environment, a host IoT device that establishes connections with one or more participant IoT devices for serving various functionalities to the participant IoT device may be provided. As an example, the various functionalities may be, but are not limited to, sharing data with the participant IoT device, sharing media content with the participant IoT device, utilizing the network of the host IoT device, and the like.

For utilizing various functionalities from the host IoT device, the participant IoT device may send a pairing request to the host IoT device. After, acceptance of the pairing request by the host IoT device, the connection may get established between the host IoT device and the requested participant IoT device.

SUMMARY

Embodiments of the invention are to provide a method of a secure pairing with a legitimate IoT device for evaluating and resolving security threats while pairing with various IoT devices within a particular range.

This summary is provided to introduce a selection of concepts, in a simplified format, that are further described in the detailed description of the invention. This summary is neither intended to identify key or essential inventive concepts of the invention and nor is it intended for determining the scope of the invention.

The present disclosure relates to embodiments of a method for providing secure pairing across devices in an Internet of Thing (IoT) environment. In an embodiment of the disclosure, the method includes identifying presence information of one or more second IoT devices in a vicinity of a first IoT device and positional information of the one or more second IoT devices relative to the first IoT device. In an embodiment, the method includes, identifying transaction context information for one or more pairing transactions between the first IoT device and the one or more second IoT devices. In an embodiment, the method includes generating a first confidence zone, based on at least one of the presence information, the positional information or the transaction context information of the one or more second IoT devices. In an embodiment, the first confidence zone represents a boundary including the first IoT device or at least one second IoT device having a confidence level parameter higher than a threshold among the one or more second IoT devices. In an embodiment, the method includes determining a pairing action between a target IoT device and the first IoT device, based on the first confidence zone and information for the target IoT device. In an embodiment, the information for the target IoT device includes at least one of presence information, positional information, or transaction context information of the target IoT device. In an embodiment, the method includes executing at least one action to establish or deny a secure pairing between the target IoT device and the first IoT device, based on the pairing action.

The present disclosure relates to embodiments of a first IoT device which provides secure pairing across devices in an IoT environment, the first IoT device. In an embodiment, the first IoT device comprises a memory storing one or more instructions and at least one processor configured to execute the one or more instructions stored in the memory. In an embodiment, the at least one processor is configured to identify presence information of one or more second IoT devices in a vicinity of a first IoT device and positional information of the one or more second IoT devices relative to the first IoT device. In an embodiment, the at least one processor is configured to identify transaction context information for one or more pairing transactions between the first IoT device and the one or more second IoT devices. In an embodiment, the at least one processor is configured to generate a first confidence zone, based on at least one of the presence information, the positional information or the transaction context information of the one or more second IoT devices. In an embodiment, the first confidence zone represents a boundary including the first IoT device or at least one second IoT device which has a confidence level parameter higher than a threshold among the one or more second IoT devices. In an embodiment, the at least one processor is configured to determine a pairing action between a target IoT device and the first IoT device, based on the first confidence zone and information for the target IoT device. In an embodiment, the information for the target IoT device includes at least one of presence information, positional information, or transaction context information of the target IoT device. In an embodiment, the at least one processor is configured to execute at least one action to establish or deny a secure pairing between the target IoT device and the first IoT device, based on the pairing action.

BRIEF DESCRIPTION OF THE DRAWINGS

These and other features of the disclosure will become better understood when the following detailed description is read with reference to the accompanying drawings in which like characters represent like parts throughout the drawings, in which.

Figure 1:
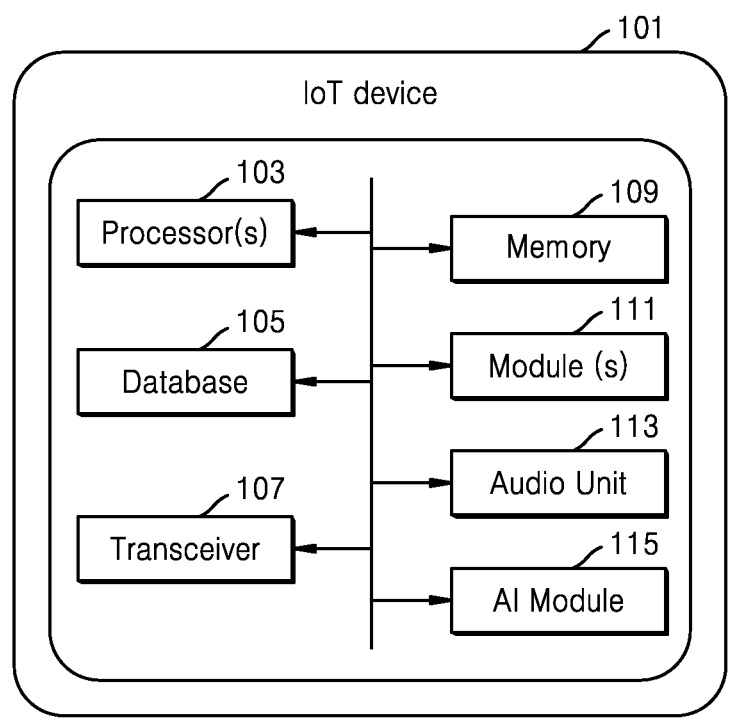
FIG. 1 illustrates a block diagram of various components implemented in an IoT device, according to an embodiment of the present disclosure

Further, skilled artisans will appreciate that elements in the drawings are illustrated for simplicity and may not been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The terms 'first', 'second', 'target' or the like are only used to distinguish each element or component in the description, and not to limit the order or features of the each element or component. In an embodiment, a description of a 'first' device may also apply to a 'second' device, and conversely, a description of a 'second' device may also apply to the 'first' device.

For utilizing various functionalities from the host IoT device, the participant IoT device may send a pairing request to the host IoT device. After, acceptance of the pairing request by the host IoT device, the connection may get established between the host IoT device and the requested participant IoT device. However, such pairing may be susceptible to performing various illegitimate activities if paired with an illegitimate IoT device.

Consider an exemplary scenario, where a user has all his personal information like banking details, photos, in his phone. The user phone in this scenario may be referred to as the host IoT device. Thus, when any participant IoT device comes within a discovery range of the user's host IoT device, the participant IoT device may steal the personal information from the host IoT device after establishing the connection with the host IoT device. In another example scenario, the participant IoT device may send malicious files to the host IoT device after establishing the connection with the host IoT device. Thus, it is desired to provide a secure pairing with a legitimate IoT device that evaluates and resolves security threats while pairing with various IoT devices.

Consider another exemplary scenario of a home IoT environment, where the user's phone is connected with a music player to listen to music selected by the user. A guest's phone may be paired with the user's phone. The guest may intervene to override the user's choice of music to play a different song thereby disrupting the user's privacy & security.

Consider yet another exemplary scenario, where IoT devices with the same name may be present in the IoT environment. The user may intend to initiate pairing with one of the IoT devices present in his home environment based on the same name. However, the user may end up pairing up with an unintended device outside the home environment, thereby disrupting the user's privacy and security. Thus, it is desired to provide a secure pairing with the legitimate IoT device that lies within the particular range.

According to an embodiment, the present disclosure provides a system and method for providing secure pairing across devices in an Internet of Thing (IoT) environment. The disclosure provides a secure means to pair devices in an IoT environment for a secure user experience in a smart environment.

As an example, the IoT environment may include a host IoT device and one or more participant IoT devices. As an example, the host IoT device may include devices that belong to or is in control of the user. As an example, the user may be referred to as an owner or host of the host IoT device without deviating from the scope of the disclosure. The host IoT device may be alternatively referred to as a first IoT device hereinafter without deviating from the scope of the disclosure. The first IoT device may provide various functionalities to one or more participant IoT devices after pairing.

As an example, the one or more participant IoT devices may include devices that are coming under a discovery range of the first IoT device. The one or more participant IoT devices do not belong to or are in control of the user. The one or more participant IoT devices may be alternatively referred to as a guest IoT device or a second IoT device without deviating from the scope of the disclosure.

As an example, the one or more second IoT devices may include, but are not limited to, IoT devices that are not previously paired with the first IoT device, IoT devices that are previously paired with the first IoT device. Further, the first IoT device and the one or more second IoT devices are an ultrawide band (UWB) enabled IoT devices.

According to an embodiment of the present disclosure, the system disclosed here continuously monitors all the IoT devices in an IoT environment. The system determines positional information corresponding to a distance and a direction with respect to each of a second IoT device relative to a first IoT device using ultrawideband (UWB) sensor is determined. Then a device transactions context that is associated for one or more pairing transactions between the first IoT device and the one or more second IoT devices are monitored over time. Based on the positional information and device transactions context various profiles of the secondary IoT device are generated. The various profiles are then used to generate a confidence zone that includes the first IoT device or at least one second IoT device having a confidence level parameter higher (or greater) than a threshold value. Thus, when an incoming pairing request is being received by the first IoT device from the second IoT device, then based on the correlation of the positional information of the second IoT device with the generated first confidence zone, a risk level associated with the incoming pairing request is determined. Thus, based on the determined risk level, the first IoT device deny or establish a secure pairing between the first and the second IoT devices. An implementation of the aforesaid methodology will hereinafter be described in detail.

FIG. 1 illustrates a block diagram of various components implemented in an IoT device, according to an embodiment of the present disclosure. As an example, the IoT device 101 as shown in FIG. 1 is the example of the first IoT device, the second IoT device, or target IoT device. An embodiment of one of the first IoT device and the second IoT device is depicted in FIG. 1 for convenience of illustration. Further, in an IoT environment there may include one or more first and the second IoT devices, however for the sake of simplicity, an explanation has been made with respect to one IoT device. Thus, without deviating from the scope of the disclosure it is to be understood that pairing may be made with one or more first IoT devices with one or more second IoT devices.

According to an embodiment, the IoT device 101 may include one or more processor(s) 103, a database 105, a transceiver 107, a memory 109, one or more module(s) 111, an audio unit 113, and an artificial intelligence (AI) module 115 that are coupled with each other. As an example, the IoT devices 101 are, but are not limited to, a washing machine, a television, mobile devices, a speaker, a refrigerator, an air conditioner, heating appliances, monitoring systems, a home appliance, alarm systems, sensors, watch, and the like. As would be understood, each of the aforementioned examples is smart devices that are able to connect with one or more remote servers or IoT cloud servers. The remote servers or the IoT cloud server are, for example, but not limited to, the Cloud or Smart-Home Edge Software. Further, the first IoT device may be a part of an IoT environment. In an example, the Smart-Home Edge Software 109 may be implemented in a hub device or in a computing device.

In an example, the processor 103 may be a single processing unit or a number of units, all of which could include multiple computing units. The processor 103 may be implemented as one or more microprocessors, microcomputers, microcontrollers, digital signal processors, central processing units, logical processors, virtual processors, state machines, logic circuitries, and/or any devices that manipulate signals based on operational instructions. In an example, the processor 103 is configured to fetch and execute computer-readable instructions and data stored in the memory 109.

The memory 109 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Figure 2:
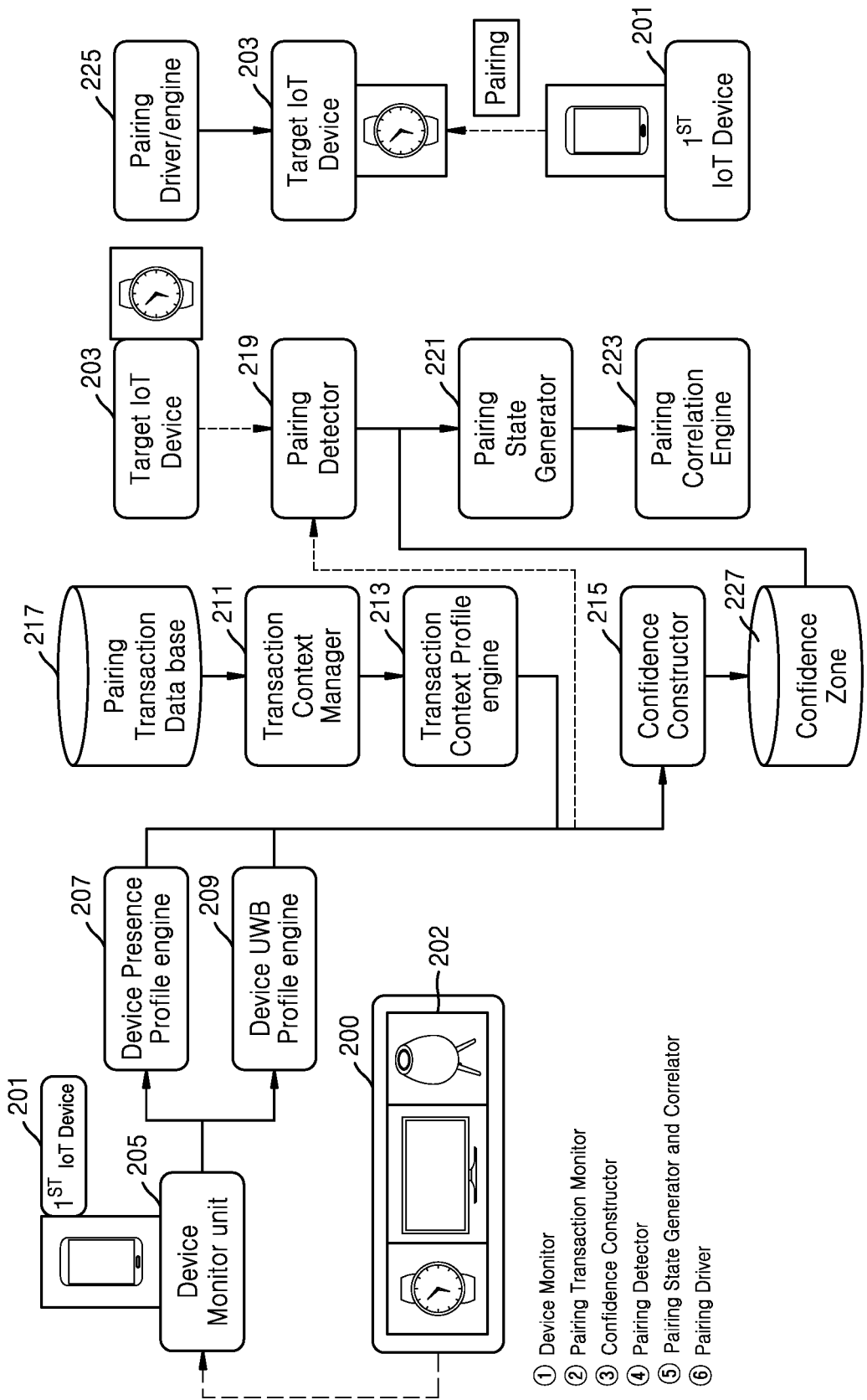
FIG. 2 illustrates an operational flow for providing secure pairing across devices in an Internet of Thing (IoT) environment, according to an embodiment of the present disclosure.

In an example, the module(s) 111 may include a program, a subroutine, a portion of a program, a software component or a hardware component capable of performing a stated task or function. As used herein, a module(s) 111 may be implemented on a hardware component such as a server independently of other modules, or a module can exist with other modules on the same server, or within the same program, or in the cloud, Smart-home edge software, or on IoT devices 101. The module(s) 111 may be implemented on a hardware component such as processor one or more microprocessors, microcomputers, microcontrollers, digital signal processors, central processing units, state machines, logic circuitries, and/or any devices that manipulate signals based on operational instructions. The module(s) 111 when executed by the processor 103 may be configured to perform any of the described functionalities. As an example, the module (s) 111 may include, as shown in FIG. 2, a device monitor unit 205, a build device presence profile 207, a device UWB profile 209, a transaction context manager 211, a pairing correlation engine 223, a transaction context profile engine 213, a confidence constructor 215, a pairing detector 219, a pairing state generator 221, a pairing engine 225. Operations of each of the aforesaid components will be described later in greater detail.

The database 105 may be implemented with integrated hardware and software. The hardware may include a hardware disk controller with programmable search capabilities or a software system running on general-purpose hardware. The examples of the database are, but are not limited to, in-memory database, cloud database, distributed database, embedded database, and the like. The database 105, amongst other things, serves as a repository for storing data processed, received, and generated by one or more of the processors 103, and modules 111. As an example, the database 105 may include a pairing transaction data 217 and confidence zone 227. The implementation of the data base 105 will be described later in detail.

The audio unit 113 may include a speaker and/or mic to produce an audio output and/or an audio input, respectively. The audio output may be implemented through a number of techniques such as Automatic Speech Recognition (ASR), Natural Language Understanding (NLU), Natural Language Processing (NLP), Natural Language Generation (NLG), or the like.

The transceiver 107 may include or be defined by a transmitter and a receiver unit. The transceiver 107 may communicate with the user and/or other IoT devices via any of the wireless standards, such as 3G, 4G, 5G, or the like, other wireless techniques, such as Wi-Fi, Bluetooth™, etc. may also be used.

The AI module 115 may include a plurality of neural network layers. Examples of neural networks include, but are not limited to, convolutional neural network (CNN), deep neural network (DNN), recurrent neural network (RNN), Restricted Boltzmann Machine (RBM). The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning. At least one of a plurality of CNN, DNN, RNN, RMB models and the like may be implemented to thereby achieve execution of the present subject matter's mechanism through an AI model. A function associated with AI may be performed through the non-volatile memory, the volatile memory, and the processor. The processor may include one or more processors. At this time, one or more processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or more processors control the processing of the input data in accordance with a predefined operating rule or artificial intelligence (AI) model stored in the non-volatile memory and the volatile memory. The predefined operating rule or artificial intelligence model is provided through training or learning.

FIG. 2 illustrates an operational flow for providing secure pairing across devices in an Internet of Thing (IoT) environment, according to an embodiment of the present disclosure. FIG. 2 will be described by referring to FIG. 1 for ease of description. Further, the same or like elements are labeled with the same or like reference numerals for the sake of simplicity and ease of explanation throughout the disclosure. According to an embodiment, one or more IoT devices (i.e., one or more second IoT device) 202 operating in an IoT environment 200 are monitored by a device monitor unit 205. As an example, multiple IoT devices 202 may be placed in any locations within a predetermined space, e.g., an apartment.

Figure 3:
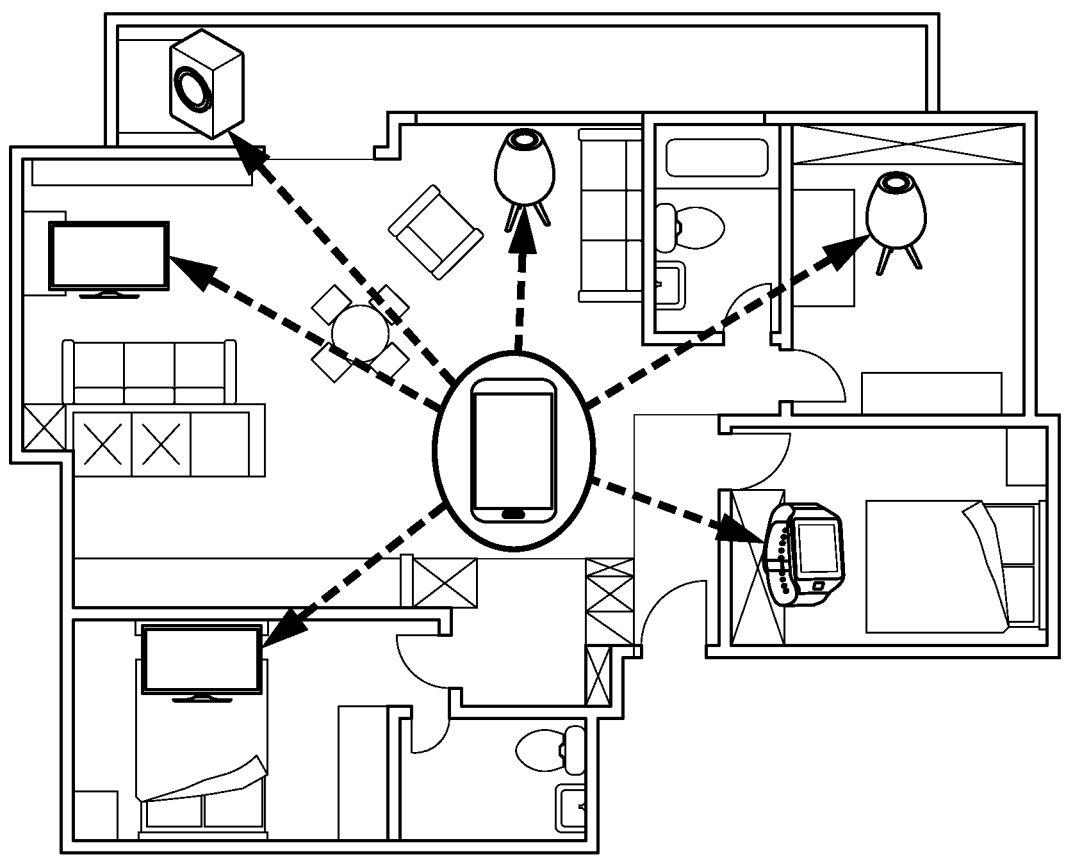
FIG. 3 illustrates an exemplary scenario for monitoring one or more IoT devices, according to an embodiment of the present disclosure.

According to an embodiment, the device monitor unit 205 may be configured to monitor the presence of one or more second IoT devices in a vicinity of a first IoT device as shown in FIG. 3. FIG. 3 illustrates an exemplary scenario for monitoring one or more IoT devices, according to an embodiment of the present disclosure. The device monitor unit 205 may be configured to periodically monitor the presence of one or more second IoT devices 202 in the vicinity of the first IoT device 201. According to an embodiment, the device monitor unit 205 may be configured to receive a plurality of device parameters from at least one selected from a plurality of sensors in at least one of the one or more second IoT devices 202. The plurality of sensors may be implemented in the IoT environment 200. According to an embodiment the plurality of device parameters may be obtained from historical data stored in the database 105 of the first IoT device 201 or the one or more second IoT devices 202.

As an example, the plurality of device parameters includes at least one selected from signal strength information, device type information, presence time information, total visibility time information, distance information, direction information, obstruction and device name information of the one or more IoT second devices 202. As an example, the signal strength information provides information about the poor, good, medium signal strength of the second IoT device after the presence of the second IoT device 202 is being detected. As an example, the device type information provides information if the type of the device is a watch, a speaker, a mobile phone and the like. In an example, the presence time information provides information about the timing of the presence of the secondary IoT device for that particular day. In an example, the total visibility time information provides information about the timing of the presence of the secondary IoT device for a month. As an example, the device name information may include the name of the devices. For example, the name of the devices may be provided to or set in the watch, the speaker, the mobile phone, and the like.

According to an embodiment, the device presence profile 207 may be configured to generate a device presence profile based on the received plurality of parameters. As an example, the device presence profile includes the presence of the one or more second IoT devices 202 in a vicinity of the first IoT device 201. Table 1, 2 and 3 show an example of the generated the device presence profile of all the IoT devices including one or more second IoT devices 202 in the vicinity of the first IoT device 201.

TABLE 1

| Variable | Values |
| --- | --- |
| Discovered Device | Yes |
| Signal strength | High |
| Device Type | TV |
| Presence Time | 5 hr |
| Total visible time | 3 months |

TABLE 2

| Variable | Values |
| --- | --- |
| Discovered Device | Yes |
| Signal strength | High |
| Device Type | Watch |
| Presence Time | 5 hr |
| Total visible time | 3 months |

TABLE 3

| Variable | Values |
| --- | --- |
| Discovered Device | Yes |
| Signal strength | High |
| Device Type | TV |
| Presence Time | 5 hr |
| Total visible time | 3 months |

According to an embodiment, the device monitor unit 205 uses UWB sensors implemented at the first IoT device 201 to measure the physical environment, distances, and direction information of devices as a plurality of parameters to generate a device positional profile thereof. According to an embodiment, the device UWB Profile engine 209 may be configured to generate the device positional profile based on the plurality of parameters. The UWB sensors are also utilized to measure obstruction information. The obstruction information may be measured as low obstruction, medium obstruction, or high obstruction. As an example, the UWB enabled devices or UWB tags may be placed in any locations within an apartment or an IoT environment may be utilized for the generating device positional profile. As an example, the device positional profile includes the positional information of each of the one or more second IoT device 202 relative to the first IoT device 201. Tables 4, 5, and 6 show an example of the generated device positional profile of all the IoT devices including one or more second IoT devices 202 in the vicinity of the first IoT device 201.

TABLE 4

| Variable | Values |
| --- | --- |
| Distance | 5 m |
| Direction | NW |
| Obstruction | Medium |

TABLE 5

| Variable | Values |
| --- | --- |
| Distance | 1 m |
| Direction | NW |
| Obstruction | Low |

TABLE 6

| Variable | Values |
| --- | --- |
| Distance | 2 m |
| Direction | SW |
| Obstruction | High |

In an embodiment, after the generation of the device presence profile and device positional profile, the transaction context manager 211, included in the first IoT device 202, may be configured to monitor, over a time period, a device transactions context associated with one or more pairing transactions between the first IoT device 201 and the one or more second IoT devices 202. In particular, the transaction context manager 211 may be configured to obtain a plurality of pairing parameters from the one or more second IoT devices 202, the first IoT device 101, or IoT devices in the IoT environment. As an example, the plurality of pairing parameters may also be obtained from a pairing transaction data 217.

Thereafter, a transaction context profile engine 213 may be configured to generate a device transactions context profile including the one or more pairing transactions and a corresponding pairing context for each pairing transaction between the first IoT device 201 and the one or more second IoT devices 202 based on the obtained plurality of pairing parameters. As an example, the device transactions context includes the device transactions context profile.

As an example, the plurality of pairing parameters includes at least one selected from a pairing time, a connection duration, a pairing request frequency, a pairing context, a rate of pairing, a successful pairing frequency and a forced pairing frequency with respect to the one or more second IoT devices 202 and the first IoT device 201. As an example, tables 7, 8, and 9 show an example of the generated device transactions context profile of all the IoT devices including one or more second IoT devices 202 in the vicinity of the first IoT device 201.

TABLE 7

| Variable | Values |
| --- | --- |
| Connection Duration | 30 mins |
| Pairing Context | Video Stream |
| Pairing Success frequency | 20 |
| Forced Pairing | 5 |

TABLE 8

| Variable | Values |
| --- | --- |
| Connection Duration | 16 hrs |
| Pairing Context | Location Tracking |
| Pairing Success frequency | 60 |
| Forced Pairing | 0 |

TABLE 9

| Variable | Values |
| --- | --- |
| Connection Duration | 15 mins |
| Pairing Context | Audio Playback |
| Pairing Success frequency | 1 |
| Forced Pairing | 20 |

Further, in such an embodiment, after the generation of the device transactions context profile, the confidence constructor 215 may be configured to generate the confidence zone representing a boundary that includes the first IoT device 201 or at least one second IoT device 202 with a confidence level parameter higher than a threshold. As an example, the confidence constructor 215 utilizes the generated device presence profile, device positional profile and device profile and the device transactions context profile for given device requested for pairing. As an example, the second IoT device 202 sent a request for pairing with the first IoT device. Thus, by utilizing various generated profiles as exemplified in tables 1-9 as inputs, the confidence constructor 215 calculates a confidence score for the IoT Devices in the vicinity including the second IoT device 202 and then determines a confidence level associated with the measured confidence zone. The IoT devices 202 with a confidence score higher (or greater) than a predefined threshold are only considered for constructing the confidence zone. Operations of the confidence constructor 215 will be described later in detail.

Figure 4A:
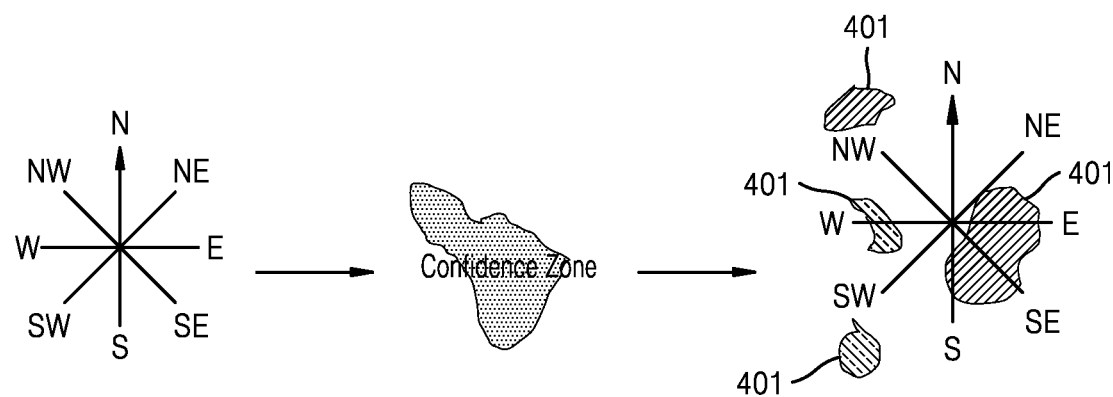
FIGS. 4A to 4C illustrate generation of confidence zone, according to an embodiment of the present disclosure.
Figure 4B:
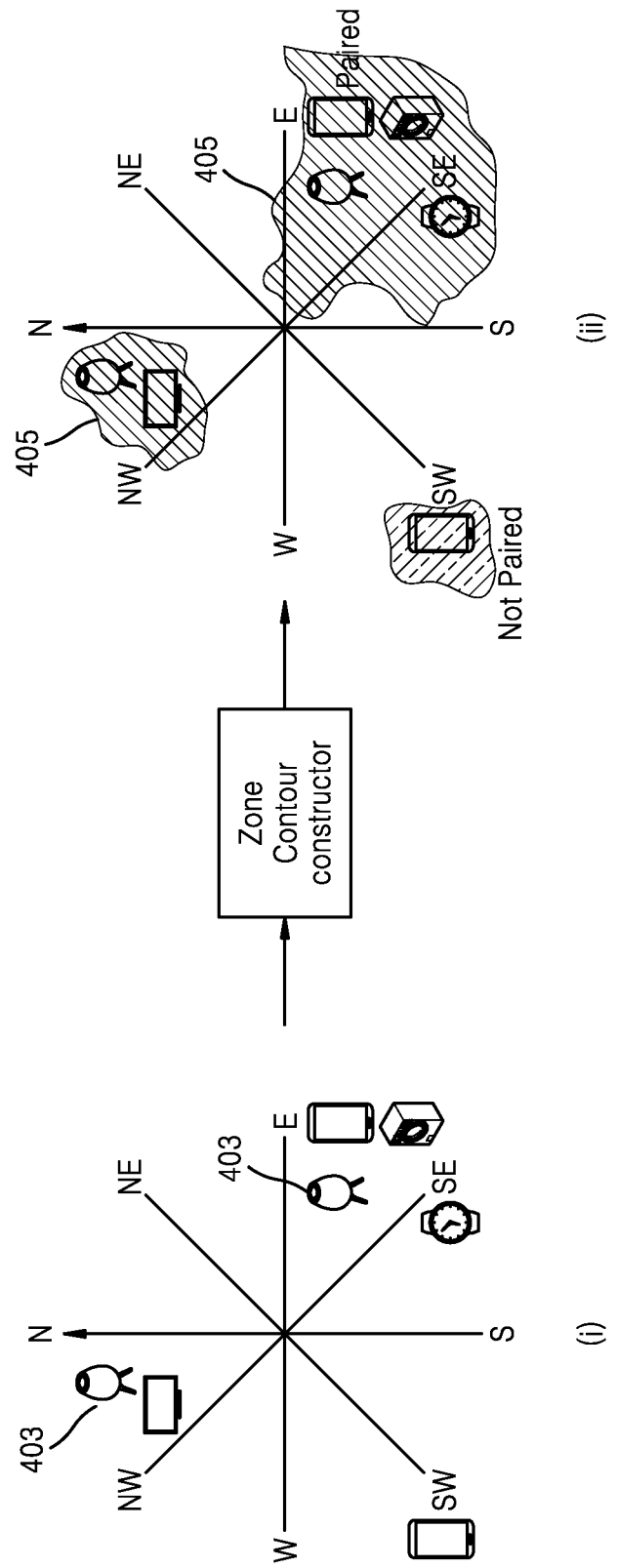
Figure 4C:
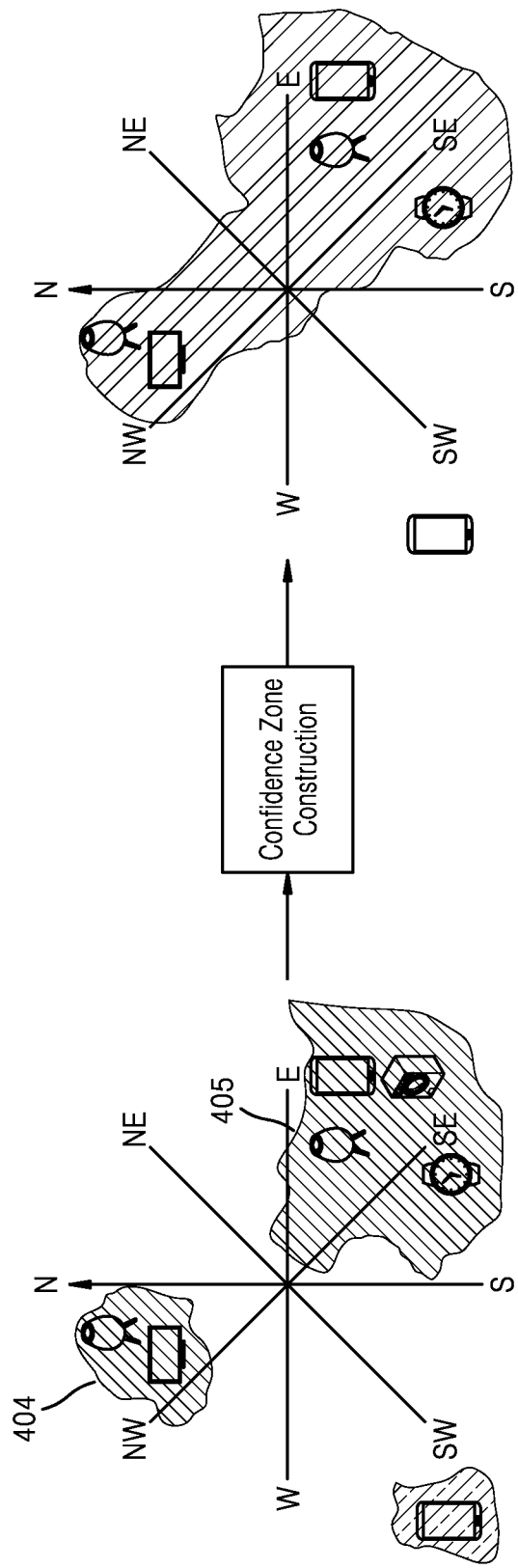

FIGS. 4A to 4C depict an example of the generation of a confidence zone, according to an embodiment of the present disclosure. According to an embodiment of the present disclosure, for generating the confidence zone, the confidence constructor 215, initially, may be configured to receive data related to a number of the one or more second IoT devices in the IoT environment and usage of the one or more second IoT devices 202 in the IoT environment. The data may be obtained by the device presence profile as described above. In particular, the data collected from the generated profiled is used to divide/contour the IoT environment into zones of maximum usage and a maximum number of devices. The confidence constructor 215 then divides the IoT environment into a plurality of zones 403 to form a cluster of one or more second IoT devices based on the received data. As an example, zones 403 may be formed by using various clustering techniques over data parameters. The plurality of zones 403 is shown in FIG. 4B.

Thereafter, the confidence constructor 215 may be configured to determine a contour 405 for each zone of the plurality of zones 403 based on at least one selected from device presence profile, a device positional profile, and a device transactions context profile. The contour 405 is shown in FIG. 4B. Table 10 shows the contouring of the zone according to an embodiment of the present disclosure.

Thereafter, the confidence constructor 215 may be configured to assign a confidence score to each of the one or more IoT second devices 202 based on at least one selected from the device presence profile, the device positional profile, and the device transactions context profile. As an example, the confidence level parameter is defined by the confidence score. The confidence constructor 215 may be configured to compare the assigned confidence score of each of the one or more IoT second devices with the threshold value, and select at least one second IoT device 202, from the one or more second IoT devices, having the confidence score higher than the threshold value for the generation of the confidence zone as shown in the FIG. 4C. Thus, the devices with a confidence score higher than a predefined threshold are only selected for constructing the confidence zone.

Thereafter, confidence constructor 215 may be configured to merge the plurality of zones with contour 404, 405 to have a single contour including the selected second IoT device, where the merged plurality of zones represents the first confidence zone as shown in FIG. 4C. Further, the confidence zone as generated may be stored in the database 105 of the first IoT device. An example of the confidence zone score calculation and comparison of the same with the threshold value is shown in the table 11.

TABLE 10

| Feature | Value |
|---|---|
| Total Device | 10 |
| Legitimate Device | 5 |
| Host Pairing History | Multiple Pairing | previously paired with the first IoT device 201 based on the monitored device transactions context in operation 505. Further, if it is determined the one or more second IoT devices 202 is previously paired with the first IoT device 201, the confidence constructor 215 may be configured to update the generated confidence zone by redefining the contour of the generated confidence zone based on at least one of the presence of one or more second IoT devices in the vicinity of the first IoT device over a time period, and the positional information. The updated confidence zone is shown in FIG. 6(c). Accordingly, the confidence zone is updated with a positive confidence zone at block 509.

Figure 6:
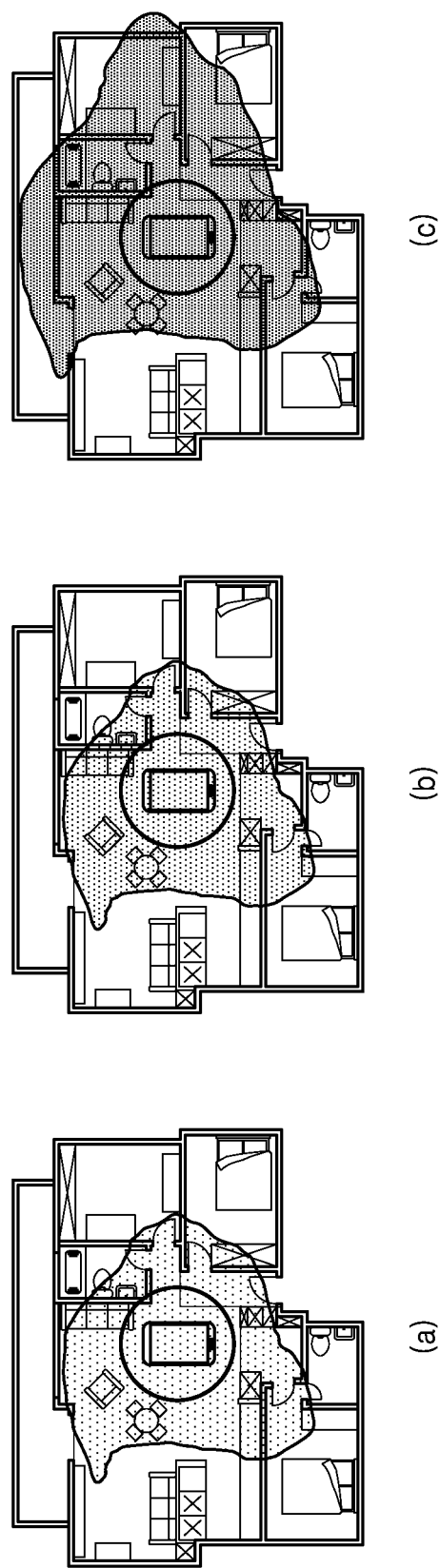
FIG. 6 illustrates a confidence zone timeline according to an embodiment of the present disclosure.

In an embodiment of the method 500, in operation 505, if the confidence constructor 215 determines that the second IoT device 202 is not previously paired, the confidence constructor 215 may be configured to update the generated confidence zone by redefining the contour of the generated confidence zone based on the presence of one or more second IoT devices in the vicinity of the first IoT device over a time period, and the positional information. The updated confidence zone is shown in the FIG. 6(b) and/or FIG. 6(a). Accordingly, the confidence zone is updated with a negative confidence zone at block 511. FIG. 6 shows a low (a), medium (b), and high (c) confidence zone, respectively.

In an embodiment of the method 500, in operation 503, if the confidence constructor 215 determines that the confidence zone of the one or more second IoT devices does not exist in the database 105, the confidence constructor 215 generate a new confidence zone and store the new confidence zone in the database 105 for future use.

TABLE 11

| distance | direction | Device Type | Pairing time | Connection duration | Know device | Pairing context | Success frequency | Forced pair | Confidence Score |
|---|---|---|---|---|---|---|---|---|---|
| 1.5 m | N-W | TV | Immediate | 30 mins | Yes | Videostream | 20 | 5 | 80 |
| 3.5 m | S-W | Watch | Immediate | 16 hrs | Yes | Location track | 60 | 0 | 70 |
| 5 m | S | Mobile | Immediate | 5 mins | No | Chromecast access | 1 | 1 | 30 |

Figure 5:
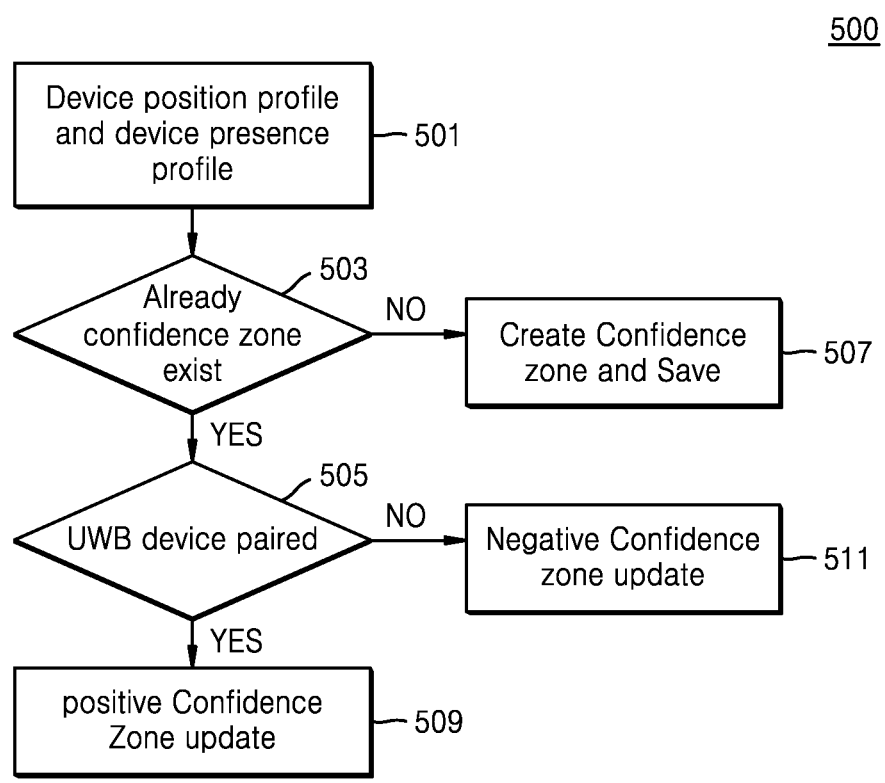
FIG. 5 illustrates a flow chart for an updating of the confidence zone while adding a new secondary IoT device, according to an embodiment of the present disclosure.

FIG. 5 illustrates a flow chart for an updating of the confidence zone while adding a new secondary IoT device, according to an embodiment of the present disclosure. In the current exemplary scenario, the least one second IoT device 202 may correspond to the IoT device that may not be previously paired with the first IoT device 201. According to an embodiment, a method 500 includes processes for updating the confidence zone. The method 500 is implemented at the confidence constructor 215. FIG. 6 illustrates a confidence zone timeline according to an embodiment of the present disclosure. FIG. 6 shows a confidence zone where a number of user's devices, for example, increases from 3, 5, and 7 respectively, within the area and current usage pattern in a home environment (living area). The method 500 shown in FIG. 5 will be described while referring to the FIG. 6 for the ease of explanation.

According to an embodiment, the method 500, initially, receives an incoming pairing request from the one or more secondary IoT devices 202. Then, in operation 503, the confidence constructor 215 may be configured to determine if a confidence zone exist in the database 105 upon receiving the incoming pairing request from the one or more second IoT devices 202. If it is determined that the confidence zone exist in the database 105 in operation 503, then it is determined that the one or more second IoT devices 202 is According to an embodiment, the pairing request is received by a pairing detector 219. Thus, while the pairing detector 219 receives a request from a target IoT device 203 i.e., pairing device, a device presence profile, a device positional profile and a device transaction context profile of the target IoT device 203, is being fetched by the pairing detector 219 for further processing. The target IoT device 203 is included in the one or more second IoT devices 202, or the target IoT device 203 is new device which is not included in the one or more second IoT devices 202. In an example, the target IoT device 203 is a device transmitting a pairing request to the first IoT device or receiving a pairing request from the first IoT device. Further, the confidence constructor 215 may be configured to generate the confidence zone as described above after the request is being received. The fetched information by the pairing detector 219 are sent to a pairing state generator 221.

According to an embodiment, the pairing state generator 221 may be configured to generate a pairing state for the first IoT device 201 and the target IoT device 203 based on at least one selected from the received plurality of device parameters, the device presence profile, the device positional profile, the monitored device transactions context and the confidence zone. As an example, Table 12 depicts an example of the generated pairing state. In the table 12, the 'Mobile' is the first IoT device or the target IoT device and the 'TV' is the first IoT device or the target IoT device.

TABLE 12

| Pairing State | | | |
|---|---|---|---|
| Mobile | | TV | |
| Feature | Value | Feature | Value |
| Application | YouTube | Platform | Android Support |
| Device Type | Mobile | Device Type | TV |
| Battery | 20% | Power | Plugged in |
| Pairing Status | Not Paired | Pairing Status | Not Paired |
| Distance of pairing Device | 2 m | Features | Screen Mirroring, Audio Playback, Casting |
| | | Confidence | High |

Figure 7:
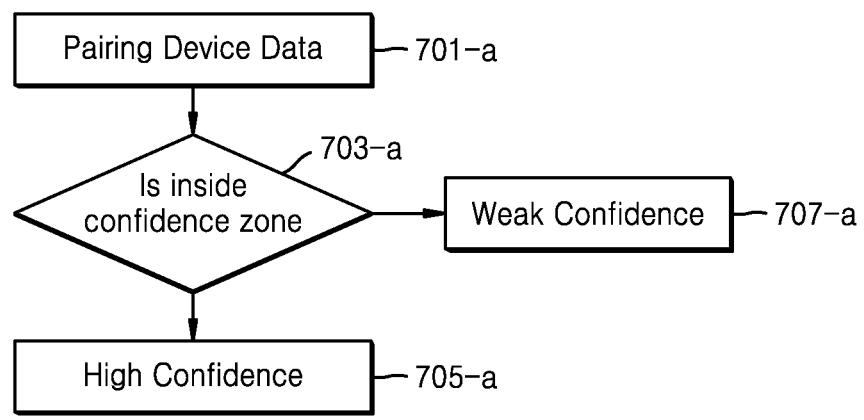
FIG. 7 illustrates a flow chart for determining the confidence level of the target device, according to an embodiment of the present disclosure.

Thereafter, the pairing state generator 221 may be configured to determine a confidence level of the target IoT device 203 based on the generated pairing state. In an embodiment, the pairing state generator 221 may determine the confidence level of the target IoT device 203 based on the positional information of the target IoT device 203 and the confidence zone (e.g., the first confidence zone). The confidence level may be included the pairing state information. FIG. 7 illustrates a flow chart for determining the confidence level of the target IoT device 203. The method 700-a as depicted in the FIG. 7 is being implemented by the pairing state generator 221. In operation 703-a, the method 700-a determines whether the target IoT device 203 (i.e., pairing device) is inside the confidence zone based on the pairing device data in operation 701-a i.e., pairing state as shown above. If it is determined that the target IoT device 203 is not inside the confidence zone, then the pairing state generator 221 determines that the confidence is weak at the process 707-a. On the other hand, if it is determined that the target IoT device 203 is inside the confidence zone then the pairing state generator 221 determines that the confidence is high at the process 705-a.

According to an embodiment, a pairing correlation engine 223 may be configured to analyze at least one selected from the pairing states of the first IoT device 201, the pairing state of the target IoT device 203, a device feature of the target IoT device 203 included in the pairing state of the target IoT device 203, and the context of the incoming pairing request of the target IoT device 203. Thereafter, the pairing correlation engine 223 may be configured to correlate the positional information of the target IoT device 203 requesting for pairing, with the generated confidence zone and the context of the incoming pairing request based on a result of the analysis. As an example, the context of the incoming pairing request may include at least one selected from an optimal pairing context, and a current user context of the target IoT device.

The pairing correlation engine 223 may calculate a correlation index for the target device (e.g., one or more second IoT devices) based on the correlation and the current user context. In an embodiment, the pairing correlation engine 223 may calculate one or more correlation indices for one or more capabilities (e.g., screen mirroring, audio playback, video calling, view item, controlling setting) of the target IoT device relative to the first IoT device based on the pairing state information. In an embodiment, the pairing correlation engine 223 may creates the correlation between individual capabilities of a IoT Device (e.g., pairing device) and the current user context (e.g., context of the current pairing request).

For example, in case that the target IoT device has never been paired with the first IoT device with respect to a first capability (i.e., pairing history: NA), a correlation index for the first capability may be determined as low. For example, in case that the target IoT device has never been paired with the first IoT device with respect to a second capability and the confidence level of the target IoT device is high-confidence, a correlation index for the second capability may be determined as medium. For example, in case that the target IoT device has ever been paired with the first IoT device with respect to a third capability and the confidence level of the target IoT device is high-confidence, a correlation index for the third capability may be determined as high. The above examples are an embodiment of the disclosure, but are not limited thereto.

As an example, the table 13-1 shows a correlation profile of the positional information of the target IoT device 203 (e.g., a visitor device) requesting for pairing, with the generated confidence zone and the context of the incoming pairing request. As an example, the table 13-2 shows a correlation profile (e.g., pairing correlation information) related to a TV device or a mobile device. For example, in the table 13-2, the TV capabilities may include one or more capabilities of the TV device used by the mobile device during pairing connection between the TV device and the mobile device.

TABLE 13-1

| Visitor device capabilities | Optimal Pairing context of Visitor device | Pairing History (As per current pairing context) | Correlation index (As per current pairing context) |
|---|---|---|---|
| Screen Mirroring | Gallery, Video | NA | Low |
| Audio Playback | Music app | NA | Low |
| Video calling | Phone App | NA | Low |

TABLE 13-2

| TV capabilities | Optimal Pairing context of TV | Pairing History(As per current pairing context) | Correlation index (As per current pairing context) |
|---|---|---|---|
| Screen Mirroring | Gallery, Video App | NA | Low |
| Audio Playback | Music app | Available | Medium |
| Video calling | Phone App | NA | Low |
| Casting | OTT Apps (YouTube, Netflix etc.) | Available | high |
| App installation on TV | Google Play store App | NA | Low |
| File transfer (Movies, docs etc.) | Adobe reader, Microsoft Word App | NA | Low |

According to an embodiment, an information in the correlation profile was fetch by a pairing engine 225. In an embodiment, the pairing engine 225 may determine a pairing action based on the pairing state information. In an embodiment, the pairing engine 225 may determine the pairing action based on the one or more correlation indices. Accordingly, the pairing engine 225 may be configured to determine a risk level associated with an incoming pairing request from the target IoT device (e.g., one or more second IoT devices) based on a correlation, of the positional information of the target IoT device with the generated confidence zone and a context of the incoming pairing request. As an example, the determined risk level may depend on the calculated correlation index. Further, the determined risk level includes a high-risk level, a low risk level or a medium risk level.

In an embodiment, the risk level may be determined based on the positional information of the target IoT device and the confidence zone. For example, when the target IoT is inside the confidence zone, the risk level may be determined as low-risk. In an embodiment, the risk level may be determined based on the confidence level of the target IoT device. For example, the lower the confidence level, the higher the risk level.

Thereafter, the pairing engine 225 may be configured to execute the incoming pairing request based on the determined risk level whether to establish or deny a secure pairing between the target device 203 and the first IoT device 201. Accordingly, the pairing engine 225 decides a pairing action and allow to establish the secure pairing between first IoT device 201 and target IoT device 203 with at least one of a full access, a medium access or a limited access to the first IoT device based on the determined risk level. Thus, the pairing engine 22 may accepts, rejects or notify the user of the first IoT device 201 based on the risk and severity level.

An example of the pairing action is shown in the table 14.

TABLE 14

| Feature | Value |
| --- | --- |
| Pairing Trust | Medium |
| Severity | Low |
| Suggested Action | Allow Pairing |

The suggested action may represent "allow pairing", "disallow pairing", or "limited access". The suggested action may be determined based on at least one of the pairing trust level, the risk level or the severity level. In an embodiment, when the suggested action is determined as "limited access", the pairing action may include information that indicate one or more allowed capabilities and one or more disallowed capabilities. In an embodiment, the one or more allowed capabilities and the one or more disallowed capabilities may be determined based on at least one of the risk level, a correlation index for each capability.

The pairing engine 225 may take pairing correlation index, confidence zone information to evaluate the pairing level access for a current pairing transaction. It also may take user feedback (e.g., 1st IoT device or host device overrides pairing action) to update correlation index for subsequent pairing transaction actions.

Figure 8:
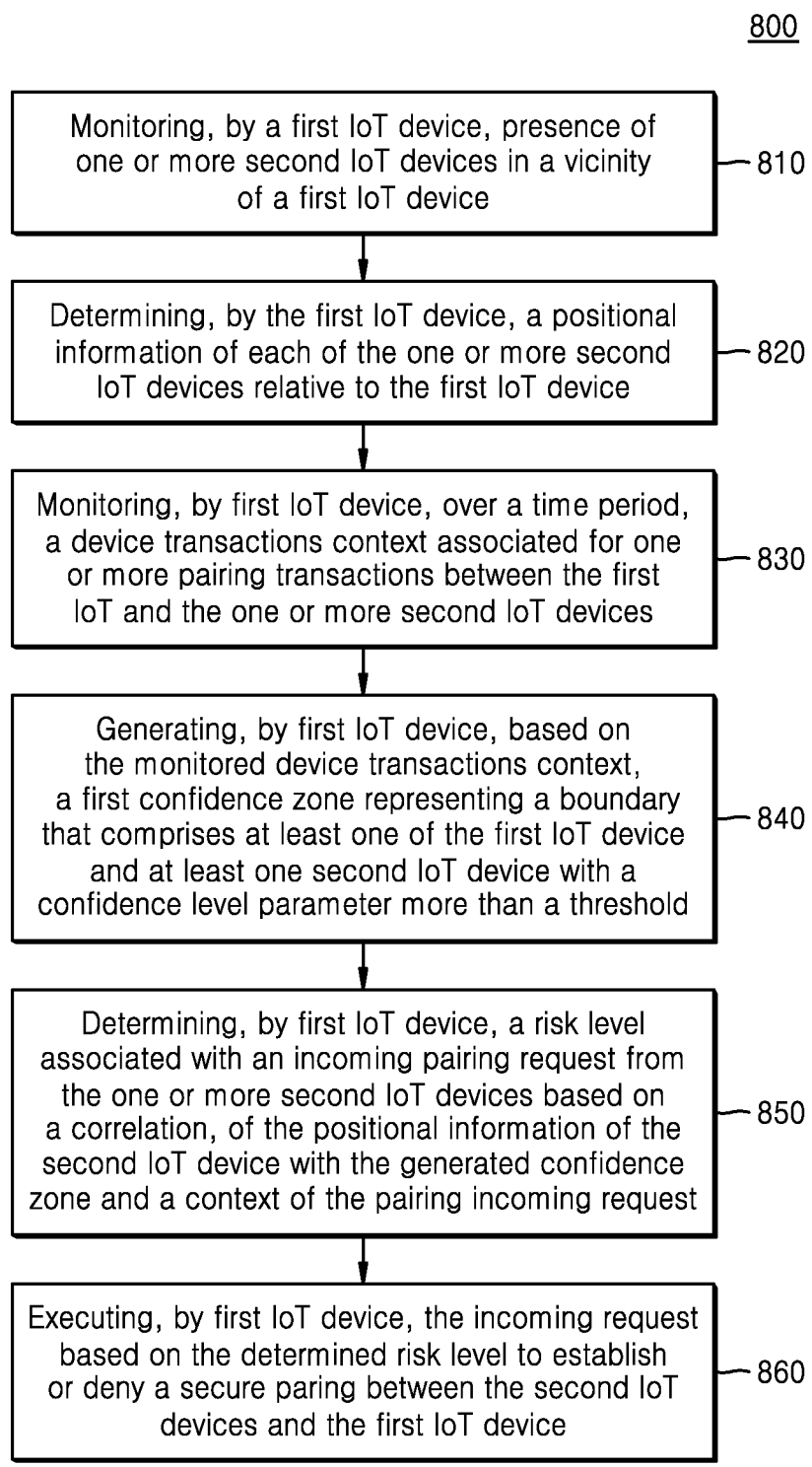
FIG. 8 illustrates a flow diagram, according to an embodiment of the present disclosure.

FIG. 8 illustrates a flow diagram, according to an embodiment of the present disclosure. The method 800 shown in the FIG. 8 may be implemented by the first IoT device (e.g., at least one processor 103 of the first IoT device) as shown above. The elements of the method 800 are the same as those described above, therefore any repetitive detailed description thereof will be omitted for the sake of brevity.

In operation 810, the method 800 includes monitoring, by a first IoT device, presence of one or more second IoT devices in a vicinity of a first IoT device. In operation 820, the method 800 includes determining, by the first IoT device, a positional information of each of the one or more second IoT devices relative to the first IoT device.

In an embodiment, the monitoring, by the first IoT device, of the presence of one or more second IoT devices, includes receiving a plurality of device parameters from at least one of a plurality of sensors in the one or more second IoT devices, implemented in the IoT environment, a historical data stored in a database of the first IoT device or the one or more second IoT devices and then generating a device presence profile and a device positional profile of each of the one or more second IoT device based on the received plurality of device parameters.

As an example, the device positional profile is generated based on the received plurality of parameters from an ultrawideband (UWB) sensors in the first IoT device, and the device positional profile including the positional information of each of the one or more second IoT device relative to the first IoT device.

As an example, the device presence profile is generated based on the received plurality of parameters including at least one selected from signal strength information, device type information, presence time information, total visibility time information, distance information, direction information, obstruction, and device name information of the one or more IoT second devices. Further, the device presence profile includes the presence of the one or more second IoT devices in the vicinity of the first IoT device. According to an embodiment, the one or more second IoT device includes at least one of previously paired IoT devices with the first IoT device, and one or more IoT devices which are not previously paired with the first IoT device. The first IoT device includes a host IoT device. Further, the first IoT device and the one or more second IoT devices are UWB enabled IoT devices.

Further, in operation 830, the method 800 includes monitoring, by first IoT device, over a time period, a device transactions context associated with one or more pairing transactions between the first IoT device and the one or more second IoT devices. In an embodiment, the monitoring, by the first IoT device, over the time period, the device transactions context, including obtaining, by the first IoT device, a plurality of pairing parameters from the one or more second IoT devices, and generating a device transactions context profile comprising the one or more pairing transactions and a corresponding pairing context for each pairing transaction between the first IoT device and the one or more second IoT devices based on the obtained plurality of pairing parameters. As an example, the plurality of pairing parameters including at least one selected from a pairing time, a connection duration, a pairing request frequency, a pairing context, a rate of pairing, a successful pairing frequency, and a forced pairing frequency with respect to the one or more second IoT devices and the first IoT device.

Further, in operation 840, the method 800 includes generating, by the first IoT device, based on the monitored device transactions context, a first confidence zone representing a boundary including the first IoT device or at least one second IoT device having a confidence level parameter higher than a threshold among the one or more second IoT devices.

In an embodiment, the generation, by the first IoT device, of the confidence zone includes receiving data related to a number of the one or more second IoT devices in the IoT environment and usage of the one or more second IoT devices in the IoT environment. Then dividing the IoT environment into a plurality of zones to form a cluster of the one or more second IoT devices based on the received data. The method include determining a contour for each zone of the plurality of zones based on at least one selected from a device presence profile, a device positional profile, and a device transactions context profile and then assign a confidence score to each of the one or more IoT second devices in each of the zone based on at least one selected from the device presence profile, the device positional profile, and the device transactions context profile. The method includes comparing the assigned confidence score of each of the one or more IoT second devices with the threshold value and selecting, at least one second IoT device, from the one or more second IoT devices, having the confidence score higher than the threshold value. The method includes merging the plurality of zones to have a single contour including the selected least one second IoT device, where the merged plurality of zones represents the first confidence zone; and then storing the first confidence zone in a database of the first IoT device.

In an embodiment, the method 800 includes receiving, by the first IoT device, the incoming pairing request from the one or more second IoT devices; and generating, by the first IoT device, a pairing state for the first IoT device and the at least one second IoT device based on at least one selected from the received plurality of device parameters, the device presence profile, the device positional profile, the monitored device transactions context and the confidence zone. Thereafter, the method 800 determines, by the first IoT device, a confidence level of the one or more second IoT devices based on the generated pairing state.

In an embodiment, the method 800 includes analyzing, by the first IoT device, at least one of the pairing states of the first IoT device, the pairing state of the at least one second IoT device, a device feature of the at least one pairing IoT device included in the pairing state of the at least one second IoT device, and the context of the incoming pairing request of the at least one pairing IoT device. The method 800 includes correlating, by the first IoT device, the positional information of the one of the one or more second IoT device requesting for pairing, with the generated confidence zone and the context of the incoming pairing request based on a result of the analysis and calculating, by the first IoT device a correlation index for the one or more second IoT devices based on the correlation and the current user context.

In operation 850, the method 800 includes determining, by first IoT device, a risk level associated with an incoming pairing request from the one or more second IoT devices based on a correlation, of the positional information of the second IoT device with the generated confidence zone and a context of the incoming pairing request. As an example, the context of the incoming pairing request includes at least one selected from an optimal pairing context, and a current user context of the at least one second IoT device.

Further, to the above, in operation 860, the method 800 includes executing, by the first IoT device, the incoming pairing request based on the determined risk level to establish or deny a secure pairing between the one of the one or more second IoT devices and the first IoT device. Thus, the method 800 includes establishing, by the first IoT device, the secure pairing between the one of the one or more second IoT devices and the first IoT device based on the determined risk level. As an example, the risk level is determined based on the calculated correlation index, and the determined risk level includes a high-risk level, a low risk level or a medium risk level.

In an implementation, the method 800, includes receiving an incoming pairing request from the one or more secondary IoT devices. The method determines if a confidence zone exist in the database upon receiving the incoming pairing request from the one or more second IoT devices. If it is determined that the confidence zone exist in the database, determining if the one or more second IoT devices is previously paired with the first IoT device based on the monitored device transactions context. Further, if it is determined that the one or more second IoT devices is previously paired with the first IoT device, updating the generated confidence zone by redefining the contour of the generated confidence zone based on the presences of one or more second IoT devices in the vicinity of the first IoT device over a time period, and the positional information. Thus, the confidence zone is updated with a positive confidence zone.

In an implementation, the method 800, includes generating a second confidence zone if it is determined that the confidence zone does not exist in the database and storing the generated second confidence zone in the database of the first IoT device.

In an implementation, the method 800, includes if it is determined that the one or more second IoT devices is not previously paired with the first IoT device and the confidence zone exists in the database, updating the generated confidence zone by redefining the contour of the generated confidence zone based on at least one of the presence of one or more second IoT devices in the vicinity of the first IoT device over a time period, and the positional information. Thus, the confidence zone is updated with a negative confidence zone.

According to one example scenario, in a case where a visitor is outside the user's home. The visitor is trying to connect a TV inside the user's home via user's phone. The method disclosed herein disallows pairing the user phone with the visitor's device based on pairing contextual data and positional information observed.

According to another example scenario, in a case where the user opens music app on his phone and wants to play song on a blue truth enabled (BLE) speaker for better audio experience. He starts searching for the speaker in his home. During that the user gets multiple speaker list in discovery. Thus, method disclosed herein provides pairing with the legitimate speaker and disallows pairing with any foreign device using contextual and positional information observed.

According to yet another example scenario, in a case where the guest who is staying inside the user's home is trying to connect his phone with the user's phone to adjust the temperature setting of the fridge. Thus, method disclosed herein allows limited access pairing of the guest phone with fridge using contextual data and positional information observed and disallows controlling the settings of the fridge.

According to yet another example scenario, in a case where the guest who is staying inside user's home is trying to access microwave oven in the user's home via his phone. In an embodiment, wherein, in case that the secure pairing with the limited access is established, the target IoT device 203 is disallowed to access the first IoT device 201 with respect to at least one device capability. Thus, method disclosed herein allows the guest only to view recipe in the oven and disallows changing the cooking temperature or modes, using contextual data and positional information observed.

Thus, as can be seen, according to embodiments of the disclosure, the method provides a secure pairing among the devices, by calculating a confidence zone and allowing the device for pairing based on the confidence zone. Further, the present disclosure provides a secured, verified, and sustained co-presence of devices.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Embodiments of the disclosure will be described below in detail with reference to the accompanying drawings. Moreover, the actions of any flow diagram may not be implemented in the order shown; nor do all of the acts need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The disclosure should not be construed as being limited to the embodiments set forth herein. Rather, these embodiments are provided so that this disclosure will be thorough and complete and will fully convey the concept of the disclosure to those skilled in the art.

While the disclosure has been particularly shown and described with reference to embodiments thereof, it will be understood by those of ordinary skill in the art that various changes in form and details may be made therein without departing from the spirit or scope of the disclosure as defined by the following claims.

Figure 9:
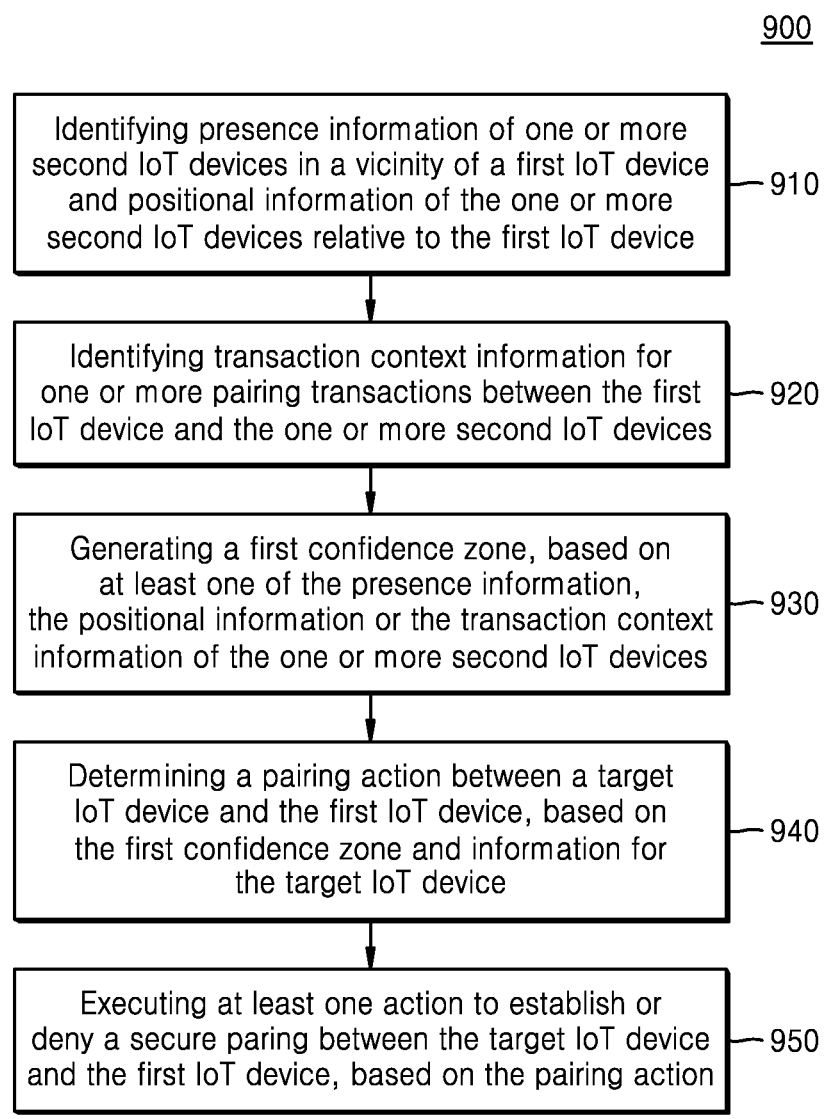
FIG. 9 illustrates a flow diagram, according to an embodiment of the present disclosure.

FIG. 9 illustrates a flow diagram, according to an embodiment of the present disclosure. The method 900 shown in the FIG. 9 may be implemented by the first IoT device (e.g., at least one processor 103 of the first IoT device) as shown above. The elements of the method 900 are the same as those described above, therefore any repetitive detailed description thereof will be omitted for the sake of brevity.

In operation 910, the method 900 includes identifying presence information of one or more second IoT devices in a vicinity of a first IoT device and positional information of the one or more second IoT devices relative to the first IoT device. In an embodiment, the operation 910 may include receiving a plurality of device parameters for the one or more second IoT devices from at least one of one or more sensors of the first IoT device, one or more sensors of the one or more second IoT devices, a historical data stored in a database of the first IoT device, or a historical data stored in a database of the one or more second IoT devices. In an embodiment, the operation 910 may include generating a device presence profile of each of the one or more second IoT devices based on the plurality of device parameters. In an embodiment, the operation 910 may include generating a device positional profile of each of the one or more second IoT devices based on the plurality of device parameters.

In an embodiment, the device positional profile may be generated based on a plurality of parameters received from an ultrawideband (UWB) sensor in the first IoT device. In an embodiment, the plurality of parameters may include at least one of signal strength information, device type information, presence time information, total visibility time information, distance information, direction information, obstruction, or device name information of the one or more IoT second devices. In an embodiment, the one or more second IoT devices may include an IoT device which is previously paired with the first IoT device or an IoT device which is not previously paired with the first IoT device. In an embodiment, the first IoT device, the one or more second IoT devices, and the target IoT device may be UWB enabled IoT devices In operation 920, the method 900 includes identifying transaction context information for one or more pairing transactions between the first IoT device and the one or more second IoT devices. In an embodiment, the operation 920 may include identifying a plurality of pairing parameters related to the one or more pairing transactions between the first IoT device and the one or more second IoT devices. In an embodiment, the operation 910 may include generating a transaction context profile of each of the one or more second IoT devices based on the plurality of pairing parameters.

In an embodiment, the plurality of pairing parameters may include at least one of a pairing time, a connection duration, a pairing request frequency, a pairing context, a rate of pairing, a successful pairing frequency, of a forced pairing frequency with respect to the one or more pairing transactions In operation 930, the method 900 includes generating a first confidence zone, based on at least one of the presence information, the positional information or the transaction context information of the one or more second IoT devices. According to an embodiment, the first confidence zone may represent a boundary including the first IoT device or at least one second IoT device which has a confidence level parameter higher than a threshold among the one or more second IoT devices.

In an embodiment, the operation 930 may include dividing the IoT environment into a plurality of zones based on at least one of the presence information, the positional information or the transaction context information of the one or more second IoT devices. In an embodiment, the operation 930 may include determining a contour for each zone. In an embodiment, the operation 930 may include assigning a confidence score to each of the one or more second IoT devices based on at least one of the contour, the presence information, the positional information, or the transaction context information of the one or more second IoT devices. In an embodiment, the operation 930 may include selecting at least one IoT device having the confidence score higher than a predefined threshold value among the one or more second IoT devices, as the at least one second IoT device. In an embodiment, the operation 930 may include merging one or more zones to a single contour comprising the at least one second IoT device to generate the first confidence zone. In an embodiment, the operation 930 may include storing information for the first confidence zone in a database of the first IoT device In operation 940, the method 900 includes determining a pairing action between a target IoT device and the first IoT device, based on the first confidence zone and information for the target IoT device. According to an embodiment, the information for the target IoT device may include at least one of presence information, positional information, or transaction context information of the target IoT device. In an embodiment, the operation 940 may include receiving an incoming pairing request from the target IoT device. In an embodiment, the operation 940 may include generating a pairing state information for the first IoT device and the target IoT device, based on the first confidence zone and the information for the target IoT device. In an embodiment, the operation 940 may include determining the pairing action based on the pairing state information.

In an embodiment, the generating of the pairing state information may include determining a confidence level of the target IoT device based on the positional information of the target IoT device and the first confidence zone, wherein the confidence level is included the pairing state information. In an embodiment, the determining of the pairing action based on the pairing state information may include calculating one or more correlation indices for one or more capabilities of the target IoT device relative to the first IoT device based on the pairing state information. In an embodiment, the determining of the pairing action based on the pairing state information may include determining the pairing action based on the one or more correlation indices.

In an embodiment, the operation 940 may include correlating the positional information of the target IoT device requesting for pairing with the first confidence zone and the context of the incoming pairing request. In an embodiment, the operation 940 may include calculating a correlation index for the target IoT device based on the correlation and a current user context of the target IoT device. In an embodiment, the operation 940 may include determining a risk level based on the correlation index, wherein the risk level is included in the pairing action.

In an embodiment, the determining of the pairing action based on the pairing state information may include correlating the positional information of the target IoT device with the first confidence zone. In an embodiment, the determining of the pairing action based on the pairing state information may include determining a risk level based on the correlation. In an embodiment, the risk level may be included the pairing action.

In an embodiment, the determining of the risk level based on the correlation may include calculating a correlation index based on the correlation and a current user context of the target IoT device. In an embodiment, the determining of the risk level based on the correlation may include determining the risk level based on the calculated correlation index. In an embodiment, the risk level may include at least one of a high-risk level, a low risk level or a medium risk level.

In operation 950, the method 900 includes executing at least one action to establish or deny a secure pairing between the target IoT device and the first IoT device based on the pairing action. In an embodiment, the operation 950 may include establishing the secure pairing with a full access or a limited access between the first IoT device and target IoT device based on the pairing action. In an embodiment, in case that the secure pairing with the limited access is established, the target IoT device may be disallowed to access the first IoT device with respect to at least one capability.

According to an embodiment, the method 900 may further include determining whether information for a second confidence zone exist in the database before the determining of the first confidence zone. The determining of the first confidence zone may include, in case that the information for the second confidence zone exist in the database, updating the second confidence zone to generate the first confidence zone based on at least one of the presence information, the positional information or the transaction context information of the one or more second IoT devices.

In an embodiment, the updating of the second confidence zone may include determining whether the one or more second IoT devices is previously paired with the first IoT device based on the transaction context information. The updating of the second confidence zone may include, in case that the one or more second IoT devices is previously paired with the first IoT device, executing positive update of the second confidence zone to generate the first confidence zone by redefining a contour of the second confidence zone based on at least one of the presence information, the positional information or the transaction context information of the one or more second IoT devices. The updating of the second confidence zone may include, in case that the one or more second IoT devices is not previously paired with the first IoT device, executing negative update of the second confidence zone to generate the first confidence zone by redefining a contour of the second confidence zone based on at least one of the presence information, the positional information or the transaction context information of the one or more second IoT devices.

The present disclosure relates to embodiments of a first IoT device which provides secure pairing across devices in an IoT environment, the first IoT device. In an embodiment, the first IoT device may include a memory storing one or more instructions and at least one processor configured to execute the one or more instructions stored in the memory. In an embodiment, the at least one processor may be configured to identify presence information of one or more second IoT devices in a vicinity of a first IoT device and positional information of the one or more second IoT devices relative to the first IoT device. In an embodiment, the at least one processor may be configured to identify transaction context information for one or more pairing transactions between the first IoT device and the one or more second IoT devices. In an embodiment, the at least one processor may be configured to generate a first confidence zone, based on at least one of the presence information, the positional information or the transaction context information of the one or more second IoT devices. In an embodiment, the first confidence zone may represent a boundary including the first IoT device or at least one second IoT device which has a confidence level parameter higher than a threshold among the one or more second IoT devices. In an embodiment, the at least one processor may be configured to determine a pairing action between a target IoT device and the first IoT device, based on the first confidence zone and information for the target IoT device. In an embodiment, the information for the target IoT device may include at least one of presence information, positional information, or transaction context information of the target IoT device. In an embodiment, the at least one processor may be configured to execute at least one action to establish or deny a secure pairing between the target IoT device and the first IoT device, based on the pairing action.

In an embodiment, the at least one processor may be configured to receive a plurality of device parameters for the one or more second IoT devices from at least one of one or more sensors of the first IoT device, one or more sensors of the one or more second IoT devices, a historical data stored in a database of the first IoT device, or a historical data stored in a database of the one or more second IoT devices. In an embodiment, the at least one processor may be configured to generate a device presence profile of each of the one or more second IoT devices based on the plurality of device parameters. In an embodiment, the at least one processor may be configured to generate a device positional profile of each of the one or more second IoT devices based on the plurality of device parameters.

In an embodiment, the at least one processor may be configured to identify a plurality of pairing parameters related to the one or more pairing transactions between the first IoT device and the one or more second IoT devices. In an embodiment, the at least one processor may be configured to generate a transaction context profile of each of the one or more second IoT devices based on the plurality of pairing parameters.

In an embodiment, the at least one processor may be configured to divide the IoT environment into a plurality of zones based on at least one of the presence information, the positional information or the transaction context information of the one or more second IoT devices. In an embodiment, the at least one processor may be configured to determine a contour for each zone. In an embodiment, the at least one processor may be configured to assign a confidence score to each of the one or more second IoT devices based on at least one of the contour, the presence information, the positional information, or the transaction context information of the one or more second IoT devices. In an embodiment, the at least one processor may be configured to select at least one IoT device having the confidence score higher than a predefined threshold value among the one or more second IoT devices, as the at least one second IoT device. In an embodiment, the at least one processor may be configured to merge one or more zones to a single contour comprising the at least one second IoT device to generate the first confidence zone. In an embodiment, the at least one processor may be configured to store information for the first confidence zone in a database of the first IoT device In an embodiment, the at least one processor may be configured to receive an incoming pairing request from the target IoT device. In an embodiment, the at least one processor may be configured to generate a pairing state information for the first IoT device and the target IoT device, based on the first confidence zone and the information for the target IoT device. In an embodiment, the at least one processor may be configured to determine the pairing action based on the pairing state information.

In an embodiment, the at least one processor may be configured to determine a confidence level of the target IoT device based on the positional information of the target IoT device and the first confidence zone, wherein the confidence level is included the pairing state information. In an embodiment, the at least one processor may be configured to calculate one or more correlation indices for one or more capabilities of the target IoT device relative to the first IoT device based on the pairing state information. In an embodiment, the at least one processor may be configured to determine the pairing action based on the one or more correlation indices. In an embodiment, the at least one processor may be configured to correlate the positional information of the target IoT device requesting for pairing with the first confidence zone and the context of the incoming pairing request. In an embodiment, the at least one processor may be configured to calculate a correlation index for the target IoT device based on the correlation and a current user context of the target IoT device. In an embodiment, the at least one processor may be configured to determine a risk level based on the correlation index. In an embodiment, the risk level may be included in the pairing action.

In an embodiment, the at least one processor may be configured to correlate the positional information of the target IoT device with the first confidence zone. In an embodiment, the at least one processor may be configured to determine a risk level based on the correlation, wherein the risk level is included the pairing action.

In an embodiment, the at least one processor may be configured to calculate a correlation index based on the correlation and a current user context of the target IoT device. In an embodiment, the at least one processor may be configured to determine the risk level based on the calculated correlation index. In an embodiment, the risk level may include at least one of a high-risk level, a low risk level or a medium risk level.

In an embodiment, the at least one processor may be configured to establish the secure pairing with a full access or a limited access between the first IoT device and target IoT device based on the pairing action. In an embodiment, in case that the secure pairing with the limited access is established, the target IoT device may be disallowed to access the first IoT device with respect to at least one capability.

In an embodiment, the at least one processor may be configured to determine whether information for a second confidence zone exist in the database before the determining of the first confidence zone. The at least one processor may be configured to, in case that the information for the second confidence zone exist in the database, update the second confidence zone to generate the first confidence zone based on at least one of the presence information, the positional information or the transaction context information of the one or more second IoT devices.

In an embodiment, the at least one processor may be configured to determine whether the one or more second IoT devices is previously paired with the first IoT device based on the transaction context information. The at least one processor may be configured to, in case that the one or more second IoT devices is previously paired with the first IoT device, execute positive update of the second confidence zone to generate the first confidence zone by redefining a contour of the second confidence zone based on at least one of the presence information, the positional information or the transaction context information of the one or more second IoT devices. The at least one processor may be configured to, in case that the one or more second IoT devices is not previously paired with the first IoT device, execute negative update of the second confidence zone to generate the first confidence zone by redefining a contour of the second confidence zone based on at least one of the presence information, the positional information or the transaction context information of the one or more second IoT devices.

What is claimed is:

1. A method for providing secure pairing across devices in an Internet of Thing (IoT) environment, the method comprising:
    identifying transaction context information for one or more historical pairing transactions between a first IoT device and one or more second IoT devices;
    selecting at least one second IoT device having a confidence level higher than a threshold among the one or more second IoT devices based on the transaction context information;
    generating a first confidence zone including the selected at least one second IoT device, based on positional information of the selected at least one second IoT device; and
    determining a pairing action between a target IoT device and the first IoT device, based on the first confidence zone and information for the target IoT device, wherein the information for the target IoT device includes at least one of positional information, or transaction context information of the target IoT device, and
    wherein a secure pairing between the target IoT device and the first IoT device is established or denied based on the pairing action.

2. The method of claim 1, further comprising:
    receiving a plurality of device parameters for the one or more second IoT devices from at least one of one or more sensors of the first IoT device, one or more sensors of the one or more second IoT devices, a historical data stored in a database of the first IoT device, or a historical data stored in a database of the one or more second IoT devices.

3. The method of claim 2, further comprising:
generating a device presence profile of each of the one or more second IoT devices based on the plurality of device parameters.

4. The method of claim 2, further comprising:
generating a device positional profile of each of the one or more second IoT devices based on the plurality of device parameters.

5. The method of claim 4, wherein the device positional profile is generated based on a plurality of parameters received from an ultrawideband (UWB) sensor in the first IoT device.

6. The method of claim 2, wherein the plurality of device parameters comprises at least one of signal strength information, device type information, presence time information, total visibility time information, distance information, direction information, obstruction, or device name information of the one or more IoT second devices.

7. The method of claim 1, wherein the at least one second IoT device is previously paired with the first IoT device.

8. The method of the claim 1, wherein the first IoT device, the one or more second IoT devices, and the target IoT device are UWB enabled IoT devices.

9. The method of claim 1, wherein the identifying of the transaction context information comprises:
identifying a plurality of pairing parameters related to the one or more historical pairing transactions between the first IoT device and the one or more second IoT devices; and
generating a transaction context profile of each of the one or more second IoT devices based on the plurality of pairing parameters.

10. The method of claim 9, wherein the plurality of pairing parameters comprises at least one of a pairing time, a connection duration, a pairing request frequency, a pairing context, a rate of pairing, a successful pairing frequency, or a forced pairing frequency with respect to the one or more historical pairing transactions.

11. The method of claim 1, further comprising:
dividing the IoT environment into a plurality of zones based on at least one of presence information, positional information or the transaction context information of the one or more second IoT devices; and
determining a contour for each zone, and
wherein the selecting of the selected at least one second IoT device comprises:
assigning a confidence score to each of the one or more second IoT devices based on the transaction context information; and
selecting at least one IoT device having the confidence score higher than a predefined threshold value among the one or more second IoT devices, as the selected at least one second IoT device, and
wherein the generating of the first confidence zone comprises:
merging one or more zones to a single contour comprising the selected at least one second IoT device to generate the first confidence zone; and
storing information for the first confidence zone in a database of the first IoT device.

12. The method of claim 1, wherein the determining of the pairing action between the target IoT device and the first IoT device comprises:
receiving an incoming pairing request from the target IoT device;
generating pairing state information for the first IoT device and the target IoT device, based on the first confidence zone and the information for the target IoT device; and
determining the pairing action based on the pairing state information.

13. The method of claim 12, wherein the generating of the pairing state information comprises:
determining a confidence level of the target IoT device based on the positional information of the target IoT device and the first confidence zone, wherein the confidence level of the target IoT device is included in the pairing state information.

14. The method of claim 12, wherein the determining of the pairing action based on the pairing state information comprises:
calculating one or more correlation indices for one or more capabilities of the target IoT device relative to the first IoT device based on the pairing state information; and
determining the pairing action based on the one or more correlation indices.

15. The method of claim 12, wherein the determining of the pairing action between the target IoT device and the first IoT device comprises:
correlating the positional information of the target IoT device requesting for pairing with the first confidence zone and a context of the incoming pairing request;
calculating a correlation index for the target IoT device based on the correlation and a current user context of the target IoT device; and
determining a risk level based on the correlation index, wherein the risk level is included in the pairing action.

16. The method of claim 1, further comprising:
determining whether information for a second confidence zone exists in a database before the determining of the first confidence zone, and
the determining of the first confidence zone comprises:
in case that the information for the second confidence zone exists in the database, update the second confidence zone to generate the first confidence zone.

17. The method of claim 16, the updating of the second confidence zone comprises:
determining whether the one or more second IoT devices are previously paired with the first IoT device based on the transaction context information;
in case that the one or more second IoT devices are previously paired with the first IoT device, executing positive update of the second confidence zone to generate the first confidence zone by redefining a contour of the second confidence zone; and
in case that the one or more second IoT devices are not previously paired with the first IoT device, executing negative update of the second confidence zone to generate the first confidence zone by redefining a contour of the second confidence zone.

18. The method of claim 1, wherein the secure pairing with a full access or a limited access is established between the first IoT device and target IoT device based on the pairing action.

19. The method of claim 18, wherein, in case that the secure pairing with the limited access is established, the target IoT device is disallowed to access the first IoT device with respect to at least one device capability.

20. A first Internet of Thing (IoT) device which provides secure pairing across devices in an IoT environment, the first IoT device comprising:

a memory storing one or more instructions; and at least one processor configured to execute the one or more instructions stored in the memory to:

identify transaction context information for one or more historical pairing transactions between a first IoT device and one or more second IoT devices;

select at least one second IoT device having a confidence level higher than a threshold among the one or more second IoT devices based on the transaction context information;

generate a first confidence zone including the selected at least one second IoT device, based on positional information of the selected at least one second IoT device; and determine a pairing action between a target IoT device and the first IoT device, based on the first confidence zone and information for the target IoT device, wherein the information for the target IoT device includes at least one of positional information, or transaction context information of the target IoT device, and wherein a secure pairing between the target IoT device and the first IoT device is established or denied, based on the pairing action.

* * * * *